US012761005B2

(12) United States Patent
Gauckler et al.

(10) Patent No.: US 12,761,005 B2
(45) Date of Patent: Oct. 13, 2026

(54) CAMERA CONTAINER FOR MILITARY AIRCRAFT

(71) Applicant: Airbus Defence and Space GmbH, Taufkirchen (DE)

(72) Inventors: Michael Gauckler, Taufkirchen (DE); Michael Trzeciak, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 202 days.

(21) Appl. No.: 18/660,528

(22) Filed: May 10, 2024

(65) Prior Publication Data

US 2026/0022924 A1 Jan. 22, 2026

(30) Foreign Application Priority Data

May 11, 2023 (DE) ......................... 102023001892.9

(51) Int. Cl.
*F42B 15/08* (2006.01)
*B64D 47/08* (2006.01)

(52) U.S. Cl.
CPC .............. *F42B 15/08* (2013.01); *B64D 47/08* (2013.01)

(58) Field of Classification Search
CPC ...................... F41G 7/22-32; F42B 15/00-38; B64D 47/08
See application file for complete search history.

(56) References Cited

U.S. PATENT DOCUMENTS 6,533,218 B1 3/2003 Jahn
7,610,841 B2 11/2009 Padan
8,575,527 B2 * 11/2013 Fry ........................ F41G 7/2293 342/52
2003/0071165 A1 4/2003 Fiebick et al.
2005/0178914 A1 8/2005 Kempas
2007/0205327 A1 9/2007 Gioffre et al.
2012/0312968 A1 12/2012 Eckhardt et al.
2014/0139730 A1 5/2014 White et al.

FOREIGN PATENT DOCUMENTS

| | | | |
|---|---|---|---|
| CN | 201376671 | Y | 1/2010 |
| DE | 7905728 | U1 | 6/1979 |
| DE | 102004003773 | A1 | 9/2005 |
| DE | 102011104023 | A1 | 12/2012 |
| DE | 102015005707 | A1 | 11/2016 |
| DE | 102015009577 | A1 | 1/2017 |
| DE | 102015013349 | A1 | 4/2017 |
| DE | 102019002665 | A1 | 10/2020 |
| JP | 2765293 | B2 * | 6/1998 |
| KR | 101157070 | B1 | 6/2012 |

OTHER PUBLICATIONS

JP-2765293-B2 machine translation (Year: 1998).*
Wikipedia Luft-Boden Rakete, https://de.wikipedia.org/w/index.php?title=Luft-Boden-Rakete&oldid=232634076, zuletzt bearbeitet am Apr. 9, 2023, abgerufen Apr. 9, 2024.
Extended European Search Report including Written Opinion for Application No. 24175198.1 dated Oct. 11, 2024, pp. 1-8.

* cited by examiner

*Primary Examiner* — Matthew M Barker
(74) *Attorney, Agent, or Firm* — Lerner David LLP

(57) ABSTRACT

A camera container for military aircraft includes a removable outboard container, wherein the camera container is the casing of an adopted guided missile and has devices for detecting the guided missile by the aircraft, at least one autonomous camera system, casing elements of optically transparent material and also compensating masses and a pressure compensating valve.

3 Claims, 2 Drawing Sheets

B-B

A-A

CAMERA CONTAINER FOR MILITARY AIRCRAFT

FIELD OF THE INVENTION

The invention relates to a camera container for military aircraft for the investigation of the exit behavior of guided missiles and ballistic drop ammunition of aircraft.

BACKGROUND OF THE INVENTION

In the case of investigations of the exit behavior of guided missiles and ballistic drop ammunition of aircraft, there is often the need for visual recording for the subsequent evaluation and determination of the "non-impairment of traffic safety", for the provision of evidence, but also in the field of the operational use of ammunition.

The German published patent application DE 10 2004003773 A1 discloses an aircraft hull element with a hull body which forms an internal space and includes a viewing window. In order to achieve high-resolution image recordings in the infrared wavelength range and from a great angular range that are largely distortion-free, it is proposed that the hull body is rotatably mounted around a rotational axis.

For use in high-speed air flows, it is advantageous to prioritize the outer shape of the hull body in order to generate a low air resistance.

The US American published patent application US 2014/0139730 A1 describes a housing for use in high-speed air flows. In one embodiment, a housing for imaging devices is described. The housing has a tapering form with symmetrical angular truncations such that it tapers in the form of a wedge with two substantially planar areas. At least one area includes an opening of optically transparent material.

For measuring devices, the property of having to be carried only when necessary and not to remain permanently on the aircraft is also essential.

The German utility model GM 79 05 728 discloses a removable outboard container for aircraft which is attached to outboard carriers and is for holding devices such as photo or measuring devices. The container consists of a central part, which can be attached to the outboard carriers, and detachable front and rear parts, which, when assembled, have the form of officially approved standard, disposable outboard containers, characterized in that the parts of the outboard container are equipped inside with holding means which are designed to accommodate retractable pallets and that the equipment parts required for different uses, such as photo or measuring devices, are each mounted on pallets which can be inserted into the parts of the outboard container.

BRIEF SUMMARY OF THE INVENTION

The disadvantage of these known solutions is that they need their own certification for aeronautical acceptance, must be integrated into the aircraft system and therefore are not universally suitable for a variety of different military aircraft.

An aspect of the invention is therefore to propose a camera container for military aircraft for the investigation of the exit behavior of guided missiles and ballistic drop ammunition of aircraft that does not require aeronautical acceptance, does not affect the system of the aircraft and is universally usable for a variety of military aircraft.

The advantage of the camera container according to an embodiment of the invention is that a casing of an adopted guided missile can be kept at all stations of a flying weapon system authorized by the approval. Even for future weapon systems that will be equipped with corresponding guided missiles, the use of the camera container according to an embodiment of the invention is already possible now. Of course, the camera container can also be used on weapon systems of the same design but of other nations.

Already existing guided missiles are converted to a casing according to the invention by removing all explosives, ignition devices and electronics. Only the electronics used to detect the guided missile by the aircraft remain in the guided missile. Guided missiles that are intended exclusively for unmanned flight and are only used for integration and training can be used directly as a casing.

The use of an autonomous camera system has the advantage that there is no connection to the aircraft or to the pilot. The camera system has its own power supply and a storage medium sufficient for the duration of the operational flight. The camera is only switched on before the start of the flight, and after the flight has ended it is switched off and the storage medium removed. During operation, the autonomous camera system records continuously, in particular the exit behavior of adjacent guided missiles or ballistic drop ammunition fired or dropped by the aircraft.

The casing element of the camera container has parts of optically transparent material. The transparent material is used in the casing element where the optics of the autonomous camera systems record the surroundings from the camera container. The use of an optically transparent material to complete the casing element protects the camera system from damage, such as for example bird strikes, ensures the original flight characteristics of the casing as a result of constant aerodynamics of the surface and allows the installation of the autonomous camera systems at almost any location of the casing.

The investigation of the exit behavior of guided missiles requires the positioning of the autonomous camera systems at different positions in the casing. In order to keep the masses and center of gravity of the camera container constant despite different camera positions, compensating masses are used to ensure a compensated mass balance with little deviation of the center of gravity.

Unlike passenger aircraft, in which the cabin pressure is kept constant as the altitude increases and the outside air pressure simultaneously decreases, the camera container has a pressure compensating valve to adjust the inside pressure of the camera container to the outside air pressure.

An advantageous configuration of the camera container according to the invention is described below. The lenses of camera systems record different sections of their surroundings. The distortion of the images taken increases the wider the camera angle is. In order to obtain the greatest possible camera angle with low distortion, it is advantageous to mount the autonomous camera systems along the longitudinal axis of the camera container with at least two different angles to the vertical. This means that for example a first autonomous camera system is mounted at an angle of 90° to the vertical, i.e. horizontally, in order to record the surroundings to the right or left, and a second autonomous camera system is mounted along the longitudinal axis, for example at an angle of 135° to the vertical. The second autonomous camera system records the surroundings either to the right or to the left, but always obliquely downward. This arrangement of at least two autonomous camera systems allows a wider camera angle with little optical distortion.

The sensor dome of guided missiles is located in the front area and is made of optically transparent material. It is particularly advantageous to mount in the area of the sensor dome an autonomous camera system with a recording area axially parallel to the guiding axis with alignment in the direction of flight. With this arrangement it is possible to track the trajectory of a fired guided missile in the vicinity of the aircraft.

For better understanding, the following method for the camera container according to an aspect of the invention is described:

The explosives, ignition devices and electronics, except for the components used to detect the guided missile by the aircraft, are removed from an existing and approved guided missile. The optimum positions of autonomous camera systems for the investigation of the exit behavior of guided missiles from aircraft are determined within the casing of the camera container and the recording direction is determined. Openings are cut into the casing of the former guided missile and the openings are closed again by optically transparent material. Autonomous camera systems are mounted inside. In order to reestablish the original mass of the guided missile and the center of gravity, the mounted camera container is balanced with internal compensating masses. The start and end, and also the type of recording, are programmed on the camera before takeoff. In order to be able to use a camera container according to the invention in greatly differing and rapidly changing altitude ranges, the container is equipped with a pressure compensating valve.

DETAILED DESCRIPTION

Figure 1:
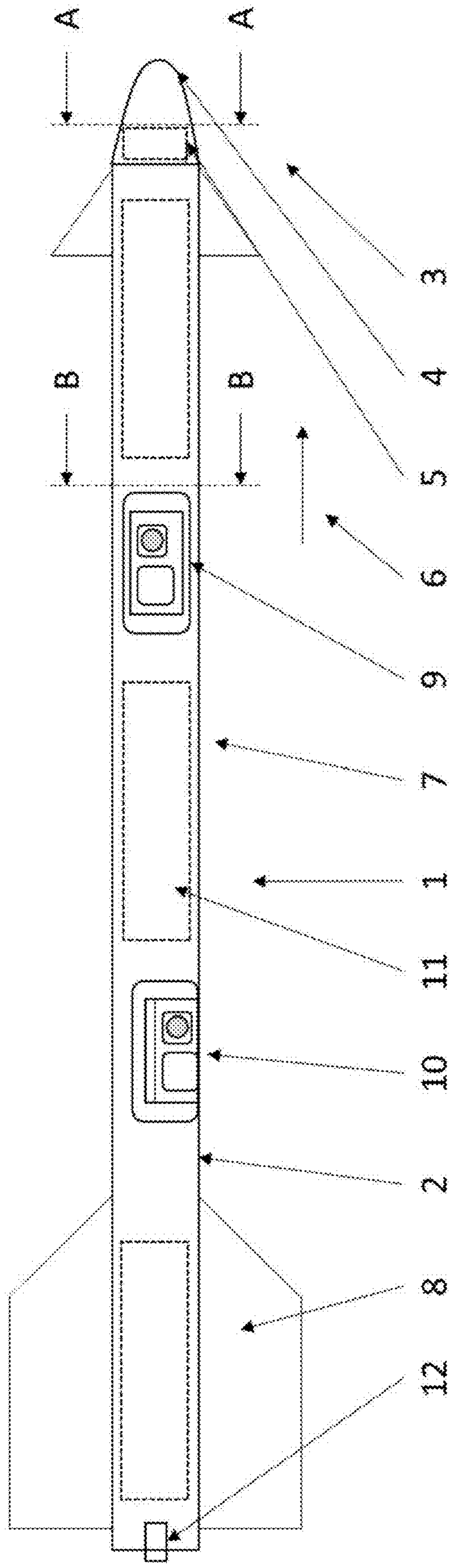
FIG. 1 shows a camera container according to the invention in side view.

FIG. 1 shows a camera container 1. The casing 2 is a former guided missile from which the explosives, ignition devices and parts of the electronics have been removed or which was already inert due to its use for training and exercise purposes. The sensor dome 4 of the former guided missile is located at the front end 3 of the camera container 1. A first autonomous camera system 5 is mounted in the sensor dome 4 axially parallel to the longitudinal axis of the camera container 1. The optics of the first autonomous camera system 5 are aligned in the direction of flight 6. In the middle and rear areas 7, 8 of the camera container 1, a second and a third autonomous camera system 9, 10 are mounted. Compensating masses 11 are mounted between the autonomous camera systems 5, 9, 10. The compensating masses 11 have the effect of simulating the original mass of the former guided missile and its center of gravity. In the rear area 8 of the former guided missile, a pressure compensating valve 12 is placed in the area of the former engine.

Figure 2:
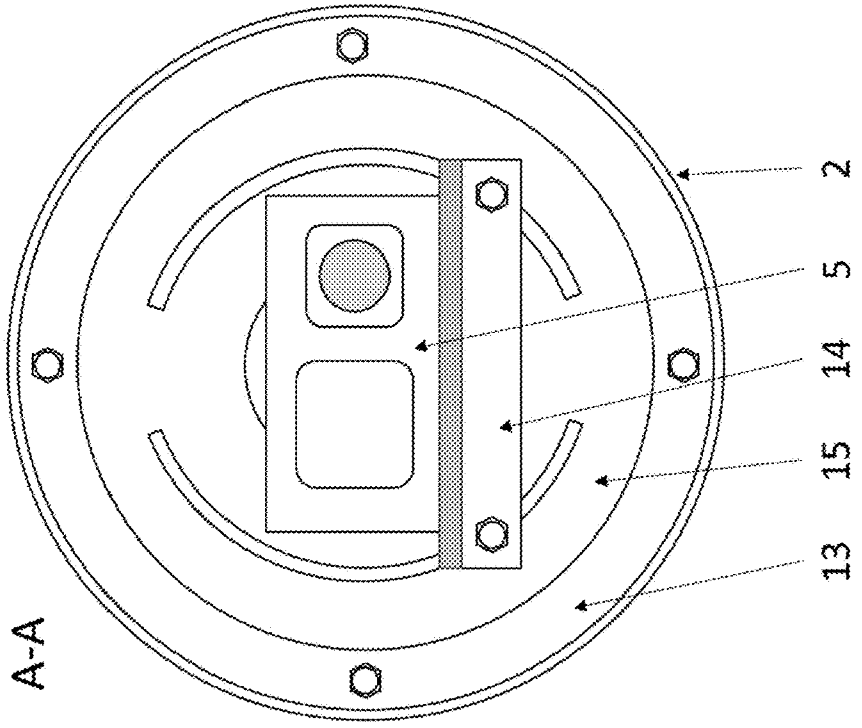

FIG. 2 shows a section A-A of FIG. 1. The interior of the casing 2 has frames 13, to which a camera table 14 is mounted via a perforated plate 15. The camera table 14 carries the first autonomous camera system 5. To freely adjust the angle of the camera tables 14 to the vertical, perforated plates 15 must be used, which are first mounted on the frames 13. The camera tables 14 are screwed to the perforated plates 15 at any angle.

Figure 3:
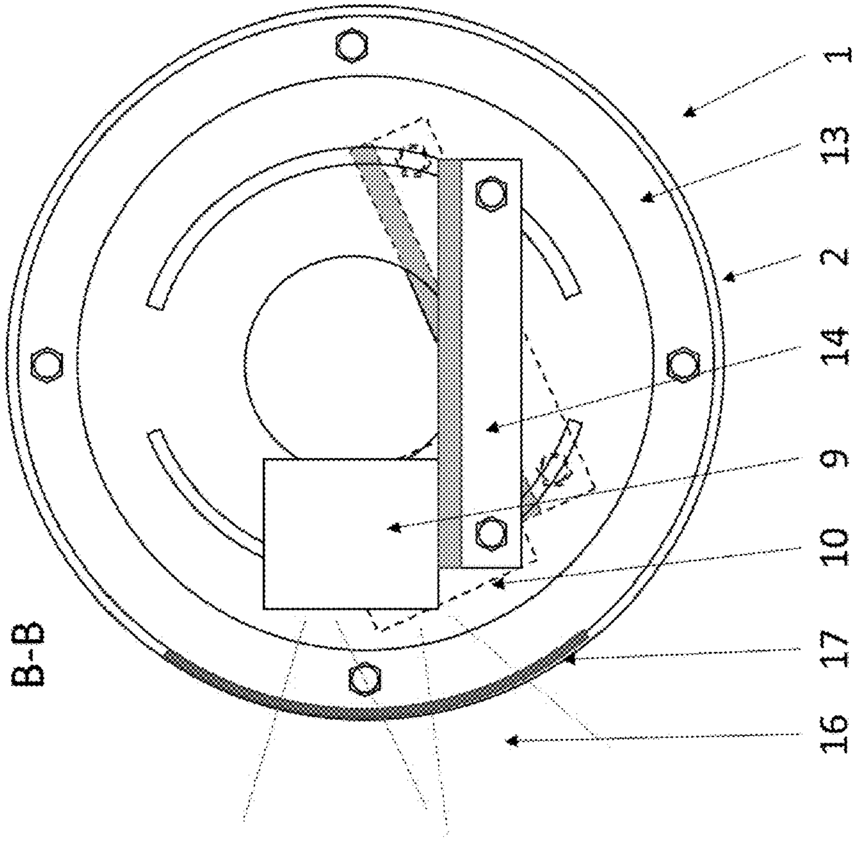
FIGS. 2 and 3 each show a section through the camera container according to the invention at the locations designated in FIG. 1.

FIG. 3 shows a section B-B of FIG. 1. The interior of the casing 2 has further frames 13 along the longitudinal axis of the camera container 1. Camera tables 14 are mounted between the frames 13. A second and a third autonomous camera system 9, 10 are set up on the camera tables. The second camera system 9 is mounted at an angle of 90° to the vertical. The third camera system 10 is mounted at an angle of 135° to the vertical. The casing 1 has an optically transparent material 17 in the recording area 16 of the optics.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Camera container
2 Casing
3 Front end
4 Sensor dome
5 First autonomous camera system
6 Direction of flight
7 Middle area
8 Rear area
9 Second autonomous camera system
10 Third autonomous camera system
11 Compensating mass
12 Pressure compensating valve
13 Frames
14 Camera table
15 Perforated plates
16 Recording area
17 Optically transparent material

The invention claimed is:

1. A camera container for military aircraft having a removable outboard container, wherein the camera container is the casing of an adopted guided missile and comprises:

- electronics used to detect the camera container by the aircraft,
- at least one autonomous camera system,
- casing elements of optically transparent material,
- compensating masses for simulating the original mass and center of gravity of a guided missile; and
- a pressure compensating valve;

wherein the camera container is inert; and wherein the at least one autonomous camera system is configured to continuously record the exit behavior of adjacent guided missiles or ballistic drop ammunition fired or dropped by the aircraft.

2. The camera container as claimed in claim 1, wherein the at least one autonomous camera system comprise at least two autonomous camera systems mounted along the longitudinal axis of the camera container with at least two different angles to the vertical.

3. The camera container as claimed in claim 1, wherein the at least one autonomous camera system comprises an autonomous camera system in the sensor dome mounted axially parallel to the longitudinal axis with the lens direction in the direction of flight.

* * * * *